United States Patent [19]

Ebbing

[11] Patent Number: 5,648,847
[45] Date of Patent: Jul. 15, 1997

[54] METHOD AND APPARATUS FOR NORMALIZING A LASER BEAM TO A REFLECTIVE SURFACE

[75] Inventor: Peter Ebbing, Los Altos, Calif.

[73] Assignee: Applied Materials, Inc., Santa Clara, Calif.

[21] Appl. No.: 400,469

[22] Filed: Mar. 7, 1995

Related U.S. Application Data

[63] Continuation of Ser. No. 210,634, Mar. 18, 1994, abandoned, which is a continuation of Ser. No. 823,808, Jan. 16, 1992, abandoned.

[51] Int. Cl.$^6$ .............................. G01B 1/00; G01B 11/30
[52] U.S. Cl. ............................................ 356/150; 356/371
[58] Field of Search ........................ 356/150-154, 356/138, 371, 375, 152.1, 152.2, 152.3; 33/286, 645, 533, DIG. 21

[56] References Cited

U.S. PATENT DOCUMENTS

| 3,554,653 | 1/1971 | Zielke et al. | 356/153 |
| 4,125,755 | 11/1978 | Plamquist | 219/121 L |
| 4,769,523 | 9/1988 | Tanimoto et al. | 219/121.6 |
| 4,998,260 | 3/1991 | Taniura | 356/152 X |

FOREIGN PATENT DOCUMENTS 1249324A 8/1986 U.S.S.R. ................. 356/371

Primary Examiner—K. Hantis
Attorney, Agent, or Firm—Thomason & Moser

[57] ABSTRACT

In an etch monitor system, a method and apparatus for adjusting the angle of incidence to normal between a laser beam and a reflective surface, such as a silicon wafer, includes a rotatable mirror having a pinhole formed therethrough, the rotatable mirror moveably mounted to be positioned in a first location within a light path and a second location out of said light path. When the rotatable mirror is located in the light path, the pinhole allows a beam of the laser beam to pass from a laser source to the reflective surface. If the beam is normal to the reflective surface, the beam is directed back toward the laser source through the pinhole. If the beam is not normal to the reflective surface, the beam is reflected by the rotatable mirror to a target, allowing observation on a lit spot of the target to enable normalization by making appropriate adjustments.

41 Claims, 4 Drawing Sheets

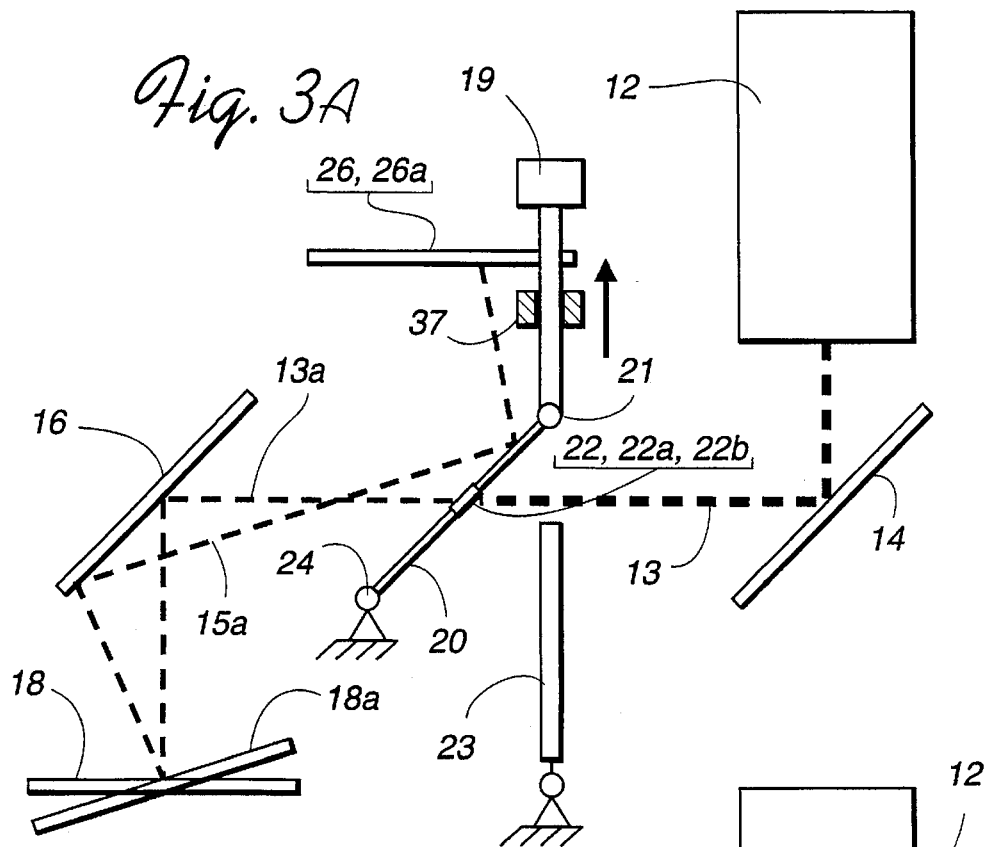
Fig. 3A
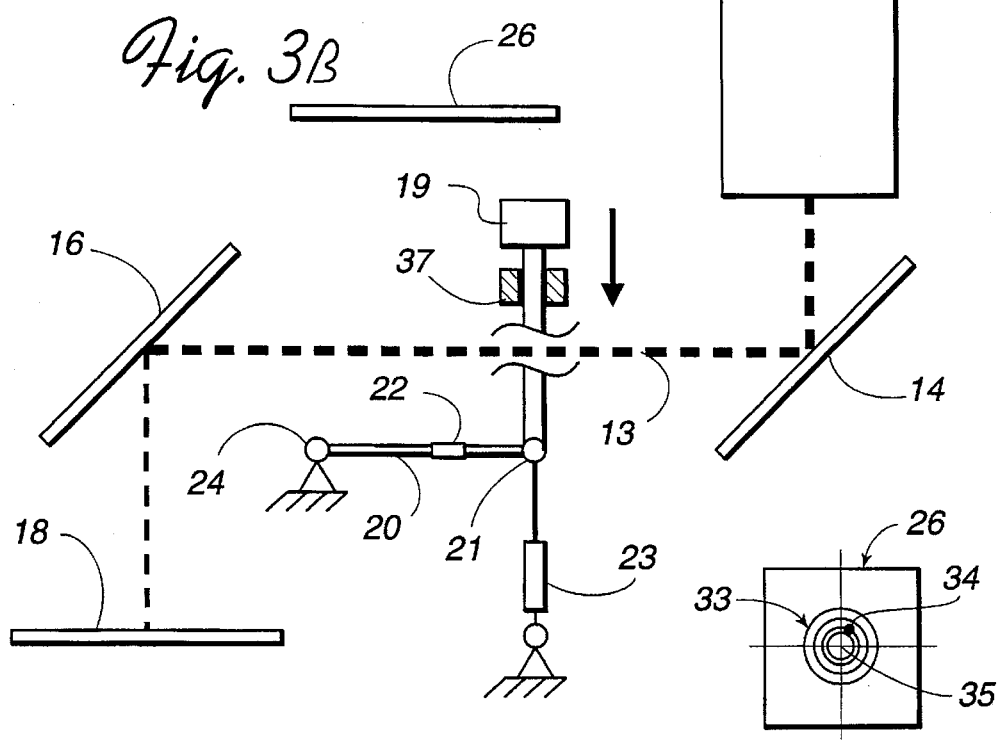
Fig. 3B
Fig. 4

METHOD AND APPARATUS FOR NORMALIZING A LASER BEAM TO A REFLECTIVE SURFACE

CROSS REFERENCE TO RELATED APPLICATION

This application is a continuation of patent application Ser. No. 08/210,634 entitled "METHOD AND APPARATUS FOR NORMALIZING A LASER BEAM TO A REFLECTIVE SURFACE" filed on Mar. 18, 1994 now abandoned which is a continuation of patent application Ser. No. 07/823,808 entitled "METHOD AND APPARATUS FOR NORMALIZING A LASER BEAM TO A REFLECTIVE SURFACE filed on Jan. 16, 1992 now abandoned.

BACKGROUND OF THE INVENTION

1. Technical Field

The present invention relates to equipment used in the fabrication of semiconductor devices. More particularly, the present invention relates to a method and apparatus for normalizing a light beam to a wafer surface in semiconductor fabrication equipment.

2. Description of the Prior Art

The process of etching a pattern in a semiconductor wafer becomes increasingly critical as device geometries shrink. Control over the rate and depth of etch is absolutely essential to the fabrication of modern integrated circuits. Techniques used to control etching rely on detection of the process end point, i.e. the point at which the etch cycle is to be concluded, taking into account depth of etch, time necessary to effect etchant flow rate reduction and chamber purge cycles, among other criteria.

An end point detection system, etch rate monitor, or etch-to-depth controller of the type currently in use is shown in FIG. 1. Such system involves a coherent, collimated light source, such as a laser beam source 12, which is typically a Helium-Neon (HeNe) laser, a Helium-Cadmium (HeCd) laser, or other such light source. The laser beam is projected through an optical train 30, including a beam expander (as with a HeNe laser), to a wafer surface 18. The beam is on the order of 6 mm wide such that a large portion of the die is covered. Depending upon the geometry of the semiconductor dies, the width of the beam may be reduced or increased. Since portions of the surface of a silicon wafer are highly reflective, the zero-order reflections are reflected back toward the source, if the beam is at normal incidence.

As the depth of the various patterns etched into the wafer surface increases, portions of the laser beam are scattered, creating a diffraction or interference pattern in the reflected laser beam which is separately detected by a collecting and detector apparatus 11 and computer processed to indicate rate and depth of etch, and from which signals may be derived to control the end point of the etch process.

It is essential that a coherent, collimated light source be normal to (i.e. at 90° to) the wafer surface in a diffraction laser etch rate monitor of the type described above, especially when devices are to be fabricated using submicron geometries. It is known in the art to perform such normalization by manually entering a slip of paper into the fringes of the illumination laser beam to determine if the zero order reflected beam coincides with the illumination beam. The angle of incidence is then corrected to normal by repositioning the laser source's angular relationship to the wafer.

Another known technique for effecting laser beam normalization is to position a beam splitter in the laser illumination beam path and arrange a target at one illumination path of the beam splitter, such that coincidence of the source and zero-order return beams may be observed on the target. Adjustments to correct for an angle of incidence that is normal may then be made as outlined above.

Such techniques as are known for achieving a normal angle of incidence between a laser beam and a reflective wafer surface pose particular problems. Using a piece of paper exposes a technician performing the adjustment to a dangerous laser beam and may result in serious injury to the technician's eyes. Since the paper is hand held, the adjustment is at best very crude and inadequate for submicron device structures. More importantly, operating technicians are not generally familiar with the construction of the etch rate monitor, nor do they understand the phenomena involved, although they can be readily instructed in performing simple calibration steps.

Using a beam splitter and target produces more accurate results than the typical adjustment procedures using a strip of paper, but attenuates the power of the laser beam. Thus, more powerful and expensive laser sources must be designed into the etch monitor equipment. The higher power levels increase the potential for injury to a technician and may also damage delicate semiconductor device structures. Also, beam splitters alter beam polarization properties and cause unwanted beam distortion.

SUMMARY OF THE INVENTION

The present invention provides an apparatus and method for achieving a normal angle of incidence between a laser beam and a reflective surface, such as a silicon wafer. When applied to a diffraction laser etch rate monitor and etch-to-depth controlling systems, the invention introduces a mirror, provided with a pinhole, into an illumination laser beam path to perform laser beam to wafer surface normalization.

In an exemplary embodiment of the invention, the mirror is moved into the laser path. The mirror backside obstructs the illumination beam, except for that portion of the beam which passes through the pinhole. If the light path is perfectly normal to the wafer surface, substantially most of the light which passes through the pinhole from the laser illumination beam is reflected back from the wafer surface and through the pinhole. If the light path is not perfectly normal to the wafer surface, the beam is reflected from the wafer surface to the mirror and from the mirror surface onto a target where it may be safely observed for purposes of achieving a normal angle of incidence.

Alignment is performed as necessary and the mirror is then moved out of the illumination path. In this way, technician exposure to the laser beam is reduced, precision adjustment of the beam/wafer angle of incidence is enabled, and laser beam power attenuation is eliminated.

BRIEF DESCRIPTION OF THE DRAWINGS

FIG. 3a is a first schematic representation of a light path according to an illustrative embodiment of the present invention;

FIG. 3b is a second schematic representation of a light path according to an illustrative embodiment of the present invention; and FIG. 4 is a top view of a target alignment pattern according to an illustrative embodiment of the present invention.

DETAILED DESCRIPTION OF THE INVENTION

Figure 1:
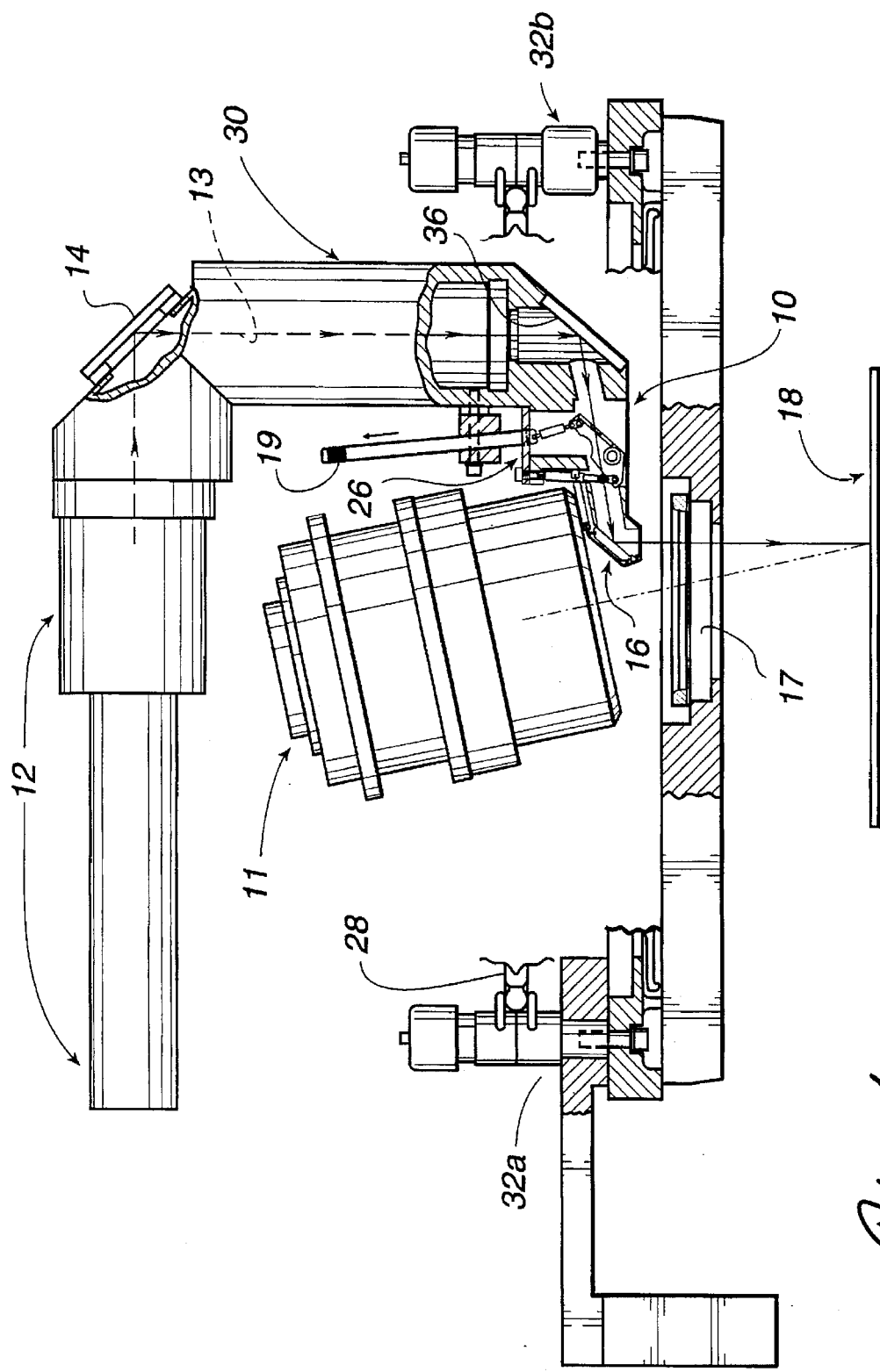
FIG. 1 is a partial cross sectional side view of an illustrative embodiment of the present invention.

The present invention is best understood by referring to the Drawings in connection with review of this Disclosure. A method and apparatus for achieving a normal angle of incidence between a laser beam and a reflective surface is disclosed. The present invention is intended for use on a reaction chamber with an etch rate monitor system of the type described above, where precise control of the rate and depth of wafer etch is a necessary step in the fabrication of semiconductor devices.

FIG. 1 shows an optical collecting and detector apparatus 11 that detects an interference or scattering pattern of a laser beam 13 as the beam is diffracted by the surface 18 of a semiconductor wafer during the wafer etching process. The laser beam produced by a laser source 12 is isolated and focused by optical train 30, which may include collimating and/or expanding optics. Beam 13 is reflected from a first steering mirror 14 via a second steering mirror 36 to a third steering mirror 16 and through a reaction chamber lid window 17 to the wafer surface. The particular optical arrangement shown in FIG. 1 is provided for purposes of example. Other optical paths may be provided as desired without departing from the spirit and scope of the present invention. For example, reaction chamber lid window 17 may be tilted such that reflections from the window are eliminated and thus do not produce ghost images on a target during operation of the present invention (as more fully described below).

Optical train 30 may also contain optical isolation elements. Such elements are necessary to insure that the portion of the beam which is reflected from the wafer surface back toward the light source does not actually reach the light source. Otherwise, the light source could be damaged.

The present invention, shown in FIG. 1 as apparatus 10/control rod 19, allows accurate adjustment of the angle of incidence between the laser beam and the wafer surface. In a preferred embodiment of the present invention, such adjustments are made to the position of a turntable 28 relative to the plane of wafer surface 18 such that laser beam 13 is normal to the wafer surface.

Turntable 28 mounts both optical collecting and detector apparatus 11 and laser source 12/optical train 30.

Adjustment of the plane of turntable 28 relative to that of the wafer surface is accomplished by interaction of adjustment/leveling devices 32a/32b. Such devices are of a type that gradually tilt the turntable along the axis of a threaded post and thus provide fine adjustment of the turntable about one or more axes from a turntable registration point. Thus, the entire plane of the turntable may be precisely adjusted relative to the wafer surface. The detection optics are designed with sufficient depth of focus such that movement inherent in adjusting the turntable to achieve a normal angle of incidence between the laser beam and the wafer surface does not affect the focus of the optical collecting and detector apparatus 11.

In the present invention, the adjusting devices are preferably of a type that are releasably lockable. Various other adjusting/leveling devices are known in the art and the invention may also be used with any of such leveling devices.

Figure 2A:
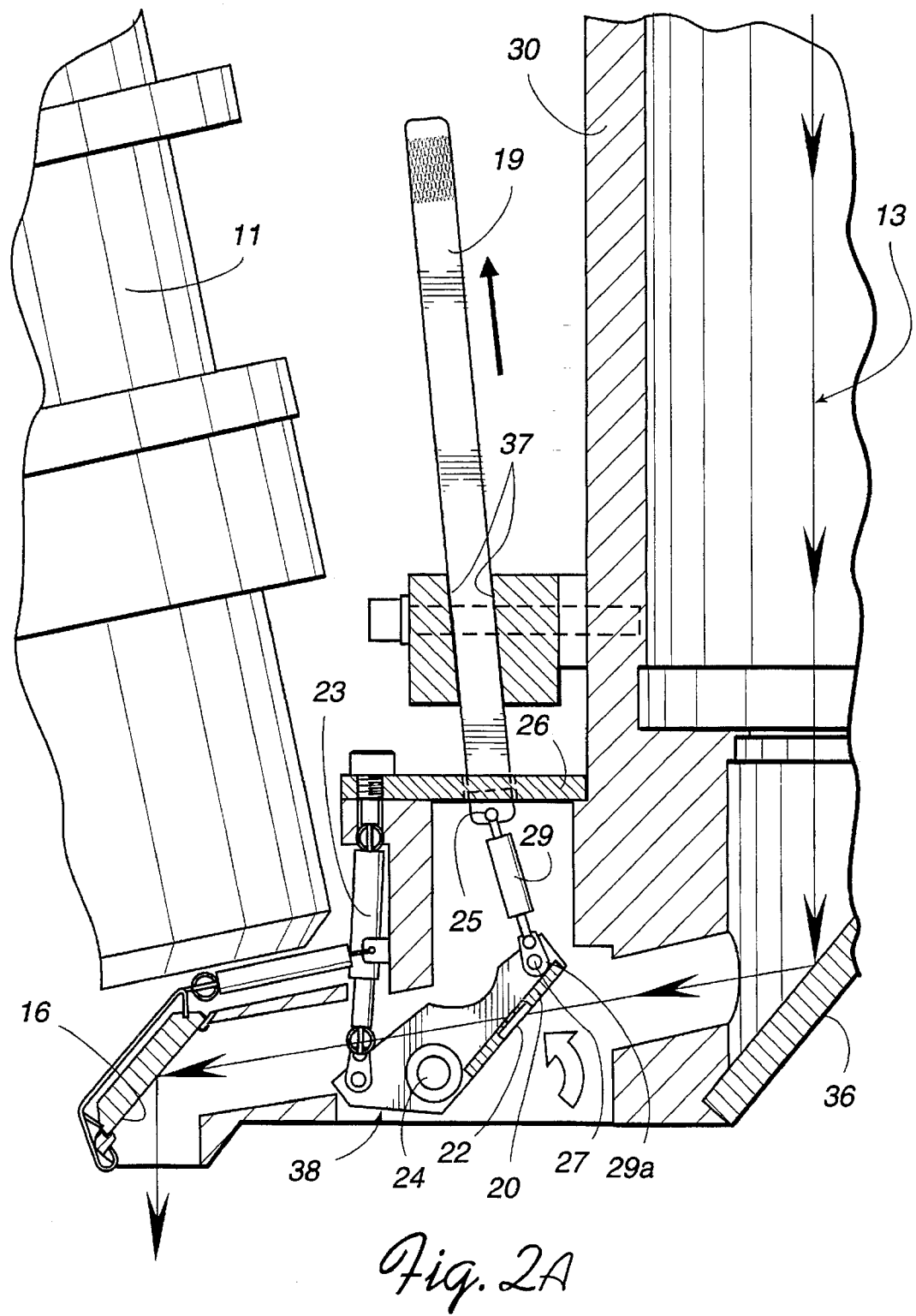
FIG. 2 is a detailed cross sectional side view of an illustrative embodiment of the present invention.
Figure 2B:
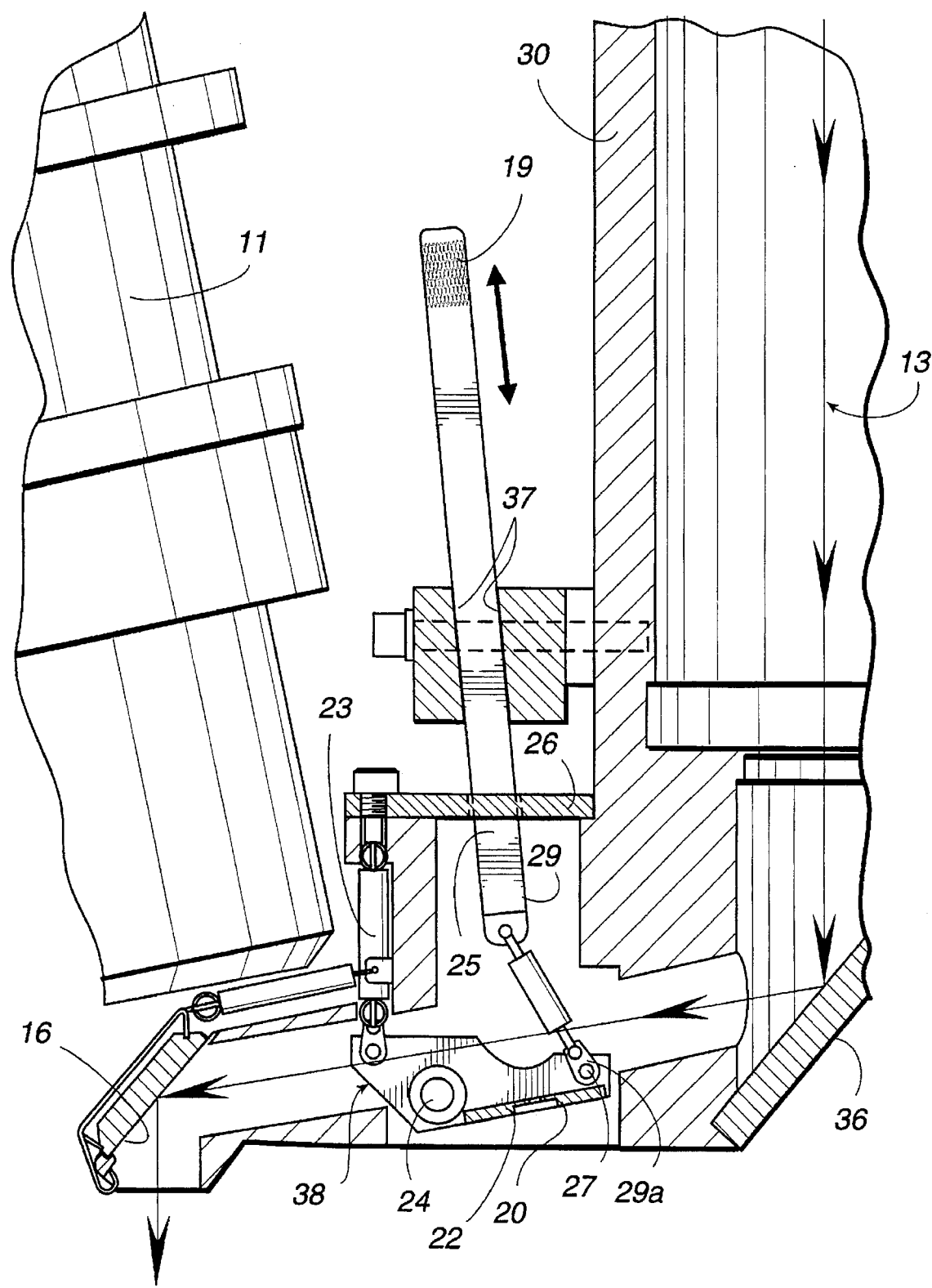

FIG. 2 is a detailed cross sectional side view of a preferred embodiment of the present invention. A laser beam which propagates along path 13 is reflected from the surface of a first steering mirror 14 to that of a second steering mirror 36, then to third steering mirror 16, and then downwardly, ideally at a 90° angle, to a wafer surface (not shown). To help effect adjustment of such angle, the present invention includes a rotatable mirror 20(20a) moveable by the operation of a control rod 19 between a first position in which the rotatable mirror is interposed within laser beam path 13 for purposes of achieving a normal angle of incidence between the laser beam and the wafer surface, and a second position outside of the laser beam path, allowing normal, unobstructed operation of the optical collecting and detector apparatus 11.

An adjustable stop (not shown) may be included such that rotatable mirror travel is limited when the rotatable mirror is brought into the path of the laser beam for normalization. Adjustment of such stop is part of a factory alignment of the entire optical path of the etch detector apparatus. Such factory alignment would also include alignment of the reflective steering mirrors and laser source to assure accurate beam propagation along the beam path.

Mirror 20 is shown in its first position (normalizing) as designated by numeral 20 and in its second position (normal etch rate monitor operation) as designated by numeral 20a. In the preferred embodiment of the present invention, rotatable mirror 20 is movable between these two positions by operation of control rod 19 which includes a pivot 25 (25a), a coupling, such as extension spring 29, a link 29a, and a second pivot 27 connected to a lever 38 which is clamped to the mirror/pivot 24. Control rod 19 moves axially within a guide or bushing 37 which assures smooth and deliberate movement of the rotatable mirror. An opposite edge of the mirror/pivot 24 provides an axis about which the rotatable mirror may be rotated between said first position to adjust for a normal angle of incidence and said second position, after such adjustment is completed.

A bias, such as spring 23, is included to maintain the rotatable mirror in said second position, out of the laser beam path. Thus, in operation a technician must maintain an upward tension on control rod 19 during adjustment of the angle of incidence for normal. Releasing control rod 19 returns rotatable mirror 20 to its second position. This feature assures that rotatable mirror 20 is not inadvertently left in the laser beam path after such adjustment is completed. Mirror 20 is maintained within laser beam path 13 by the application of tension by a technician to control rod 19 as shown by the arrow in the Fig.

Operation of the present invention is best understood with reference to FIGS. 3a and 3b. In FIG. 3a, laser source 12 produces a beam 13 that is reflected from the surface of steering mirror 14 through a pinhole 22 formed in rotatable mirror 20. The pinhole serves two functions: targeting a return path of the beam as explained in more detail below, and narrowing a wide beam on the order of 6 mm (0.24") to a width of about 1.3 mm (0.05"). The foregoing beam widths are typical for a HeNe laser light source. Other beams widths could be provided as appropriate for the light source used.

The pinhole is machined such that the inner surface of the pinhole is coaxial with both the source and return light paths and with the path of reflection to the target. In the preferred embodiment of the invention this is accomplished by boring the pinhole along both axes when the pinhole is formed.

In other embodiments of the invention, the pinhole size may be adjusted to regulate the amount of reflected laser light impinging on the target. Such adjustment allows varying amounts of light to be targeted. Thus, with a less powerful laser, or in a brightly lit environment, a greater amount of light is permitted into the light path to illuminate the target. Conversely, where less light energy is desired, the width of the beam may be narrowed as appropriate. The pinhole size may be derived by means of an adjustable diaphragm 22a. In yet other embodiments of the invention, multiple pinholes 22b may be provided, including near the perimeter of the collimated beam to check for divergence, i.e. the amount of non-collimation.

Introduction of the pinhole into the light path is significant because the initial width of the beam is such that targeting a reflection of the beam from a wafer surface in an-out-of normal system produces a large area of illumination on the target. Subtle adjustments necessary to effect normalization of the beam to the wafer would not be readily detected by a technician when a large portion of the target area is illuminated. Additionally, a technician would be observing fringing effects that might distort the actual angular relationship of the beam to the wafer surface. Narrowing the beam eliminates these effects. Finally, the technician is exposed to a greater amount of dangerous laser light if the beam is used at its full width.

The introduction of the pinhole into the light path narrows the beam and therefore targets a small area of illumination. Subtle changes in the angular relationship of the beam to the wafer produce a more significant movement of the illuminated area relative to the target when such area is smaller. An adjustment of the relationship of the beam to the wafer is thus more readily detected by a technician, thereby facilitating adjustment of the angle of incidence for normal. Reduction in the width of the beam also reduces technician exposure to the full force of the light source. In this way the normalization operation is more precise and less dangerous.

Pinhole 22 allows a beam 13a to pass along the path shown to steering mirror 16. The beam is reflected from the surface of steering mirror 16 to wafer surface 18.

If the wafer surface is normal to beam 13a, the beam is reflected back to steering mirror 16 through pinhole 22 onto steering mirror 14 and toward laser source 12.

An out-of-normal wafer surface 18a is also shown in FIG. 3a. Beam 13a is reflected from steering mirror 16 to wafer surface 18a. Because beam 13a is not normal to wafer surface 18a, a return beam 15a is reflected from the surface of steering mirror 16 to the surface of rotatable mirror 20, but not through pinhole 22. Beam 15a is reflected from the surface of rotatable mirror 20 (which may be coated so as to be reflective only in the return path of the beam) to a target 26 where it may be observed by a technician.

Target 26 is a composite of frosted/diffused and filter material in the preferred embodiment of the invention such that beam 15a illuminates the target without permitting injurious ultraviolet or infrared laser energy to be transmitted therethrough and thus injure a technician who may be observing the target. In other embodiments of the invention, the target 26 may be an electronic detector such as a photodetector 26a, or other detecting or indicating device.

Appropriate adjustment of turntable 28 is made while observing target 26. When the angle of incidence is normal between the laser beam and the wafer surface, the return beam follows path 13a through pinhole 22 toward laser source 12 and there is no longer a bright lit spot on target 26, but only a small corona effect.

FIG. 3b shows normal operation of an etch rate detection system that includes the present invention. In this mode of operation, rotatable mirror 20 is rotated about edge/pivot point 24 out of laser beam path 13. The rotatable mirror is held in this position by a bias supplied by a spring 23 or other such biasing device.

In the preferred embodiment of the invention, target 26 is provided with an alignment pattern to aid in adjusting the angle of incidence to normal. FIG. 4 shows a target having a pattern 33 that includes a center point 35 at which a small corona indication is present when a normal angle of incidence is achieved. This corona is caused by diffraction of laser light at the physical annulus of the pinhole and divergence of the beam which occurs as the beam is propagated from the pinhole to the wafer and back to the pinhole. An out-of-normal etch rate monitor would produce a lit spot, such as spot 34 on target 26.

Setting the angle of incidence for normal involves adjusting the relationship between the laser source and the wafer surface as described above, until the lit spot is moved to target pattern center 35, at which point substantially all return path laser energy is directed through pinhole 22 and no such energy is reflected to target 26 other than that which produces the corona effect discussed above.

In a preferred embodiment of the invention, this adjustment is carried on about two adjustable axes, with a pivot point fixed along a third axis provided as a stable reference point to provide a three-point lay up. Thus, the plane of turntable 28 is fine adjusted or tiltable orthogonally in two dimensions about, and normal to, a turntable registration point. The target pattern is arranged such that operation of adjustment/leveling devices 32a/32b to adjust the position of turntable 28 produces a corresponding movement of the lit spot on the target.

In the preferred embodiment of the invention, adjustment/leveling devices 32a/32b are machined such that one turn of an adjustment knob associated therewith corresponds to a specific movement of the lit spot on the target pattern along X-Y axes, i.e. the distance of one concentric ring of the target pattern to the next concentric ring is equal to one turn of the adjustment knobs, either singly, or in a combined compound movement of both adjustable knobs amounting to one turn. Thus, operation of adjustment/leveling devices 32a/32b produces a predictable vector movement of the lit spot. In this way, a technician may readily adjust the angle of incidence of the laser beam to normal.

The turntable is rotatable in the preferred embodiment of the invention and includes a brake mechanism (not shown) for holding the turntable against rotation. In case the wafer is held or clamped to a domed pedestal after initial normalization and the turntable has been rotated for centering the laser beam onto a specific die, the normalization procedure may be carried out again depending upon the extent of the wafer curvature and the amount of rotation. If desired, such normalization and locating of a die by rotation of the turntable may be automated.

Applying the present invention to the alignment of an etch rate monitor allows extremely accurate, quick adjustment of the angle of incidence to normal between the laser beam and a wafer surface. Typically, such alignment is performed with a blank silicon wafer. Thereafter, a production type wafer having known orientation may be provided as an alignment wafer, such that the etch rate detection apparatus can also be aligned. The present system avoids the attenuation of laser beam strength inherent in prior art beam splitter systems and is completely safe to operate. It has been found that the present invention is useful in precision alignment of etch rate detection and monitoring systems such that structures with submicron widths may be fabricated having capacitor trenches with depths of eight microns or more.

While the invention has been particularly shown and described with reference to an illustrative embodiment, detailing the best mode presently known for practicing the invention, it should be understood by those skilled in the art that various other modifications and changes may be made to the present invention described above without departure from the spirit and scope thereof. In particular, but not by way of limitation, the present invention includes the method by which a laser beam may be adjusted for a normal angle of incidence to a wafer surface as well as the illustrated apparatus, and all equivalents of the elements shown in the illustrative embodiment.

I claim:

1. A system for normalizing a portion of an optical path to a wafer surface of a semiconductor wafer, comprising in operative combination:

a laser for providing a laser beam;

an optical train operatively coupled to the laser for receiving the laser beam and for altering the laser beam;

an optical partition disposed for receiving the laser beam to an aperture defined by the optical partition, the optical partition having a front and a back surface, the back surface being reflective for reflecting the laser beam;

a first steering reflective surface for altering the direction of the laser beam after passing through the aperture, the first steering reflective surface for directing the laser beam along the portion of the optical path to a location on the wafer surface, the laser beam being reflecting off the wafer surface to the first steering reflective surface; and the laser beam being reflected from the first steering reflective surface to the back surface of the optical partition when the portion of the optical path is not normal to the location on the wafer surface and then being reflected off the back surface to a target.

2. The system of claim 1, wherein the laser beam is reflected from the first steering reflective surface through the aperture in the optical partition for receipt by the optical train when the portion of the optical path is normal to the location on the wafer surface.

3. The system of claim 2, wherein the optical train is further for isolating the laser beam reflected back through the aperture.

4. The system of claim 3, wherein the optical train is for collimating the laser beam after receipt from the laser.

5. The system of claim 3, wherein the optical train is for expanding the laser beam after receipt from the laser.

6. The system of claim 3, further comprising a second steering reflective surface disposed for receiving the laser beam from the optical train and for directing the laser beam to the aperture defined by the optical partition.

7. The system of claim 6, further comprising a third steering reflective surface disposed for receiving the laser beam from the laser and for directing the laser beam to the optical train.

8. The system of claim 6 wherein the target comprises an optical collector and detector for aiding in normalizing the laser beam to the wafer surface.

9. The system of claim 6, further comprising a process chamber for housing the semiconductor wafer, the process chamber including a window disposed between the first steering reflective surface and the wafer surface for allowing the laser beam to pass through the window to the wafer surface and the first steering reflective surface.

10. The system of claim 9, wherein the window is tilted such that reflections from the window are eliminated.

11. The system of claim 9, wherein the target comprises a composite of material for filtering and diffusing the laser beam reflected off the back surface of the optical partition.

12. The system of claim 11, further comprising a control rod coupled to the optical partition for positioning the optical partition between a first position interposed in the optical path of the laser beam and a second position out of the optical path of the laser beam.

13. The system of claim 12, further comprising tensioning means for maintaining the optical partition in the second position when not in use.

14. The system of claim 13, further comprising an adjustable turntable for mounting elements of the system including the target, the laser and the optical train to the turntable, the turntable adjustable for leveling to a plane of the wafer surface such that the laser beam is normal to the plane.

15. The system of claim 14, wherein the laser beam is narrowed in beam width as the laser beam passes through the aperture.

16. The system of claim 15, wherein the optical partition includes a machined inner surface for defining the aperture, the inner surface machined such that the laser beam is coaxial with the inner surface when entering the aperture from the second steering reflective surface and when entering the aperture from the first steering reflective surface.

17. The system of claim 15, wherein the optical partition includes an adjustable diaphragm for defining the aperture.

18. The system of claim 15, wherein the optical partition defines a plurality of apertures for allowing the laser beam to pass through, the plurality of apertures extending near a perimeter of the laser beam, the perimeter of the laser beam being defined by the beam width prior to passing through the plurality of apertures.

19. The system of claim 15, wherein the target includes a pattern such that operation of the turntable produces corresponding movement about the pattern of the laser beam as imaged on the target.

20. Apparatus for normalizing a light beam with respect to a reflective surface, comprising:

a light source for generating said light beam;

a mirror mounted to permit movement of said mirror to a first position and to a second position;

said mirror having an aperture through which, when said mirror is positioned in said first position, said light beam passes as the light beam propagates from said light source toward said reflective surface, said light beam reflects from the reflective surface to produce a reflected light beam, said reflected light beam propagates to said mirror, where, if the light beam is not orthogonal to the reflective surface, the reflected light beam reflects from the mirror onto a target; and said second position places said mirror outside of a propagation path of said light beam.

21. The apparatus of claim 20 wherein said light source is a laser.

22. The apparatus of claim 20 wherein said reflective surface is the surface of a semiconductor substrate.

23. The apparatus of claim 20 further comprising means for selectively inserting said mirror in a propagation path of said light beam.

24. The apparatus of claim 23 wherein said selectively inserting means further comprises:

a pivot means, located on an edge of said mirror, for pivoting said mirror about an axis along said edge such that said mirror is moveable between said first position and said second position.

25. The apparatus of claim 24 wherein said selectively inserting means further comprises a control rod, connected to said mirror, for effecting movement of said mirror between said first position and said second position.

26. The apparatus of claim 25 wherein said selectively inserting means further comprises:

bias means, connected to said mirror, for maintaining said mirror in said second position, wherein said control rod is operated to move said mirror into said first position.

27. The apparatus of claim 20 further comprising:

a process chamber within which the reflective surface is located; and a window, located in said process chamber, for permitting said light beam to enter said process chamber.

28. The apparatus of claim 27 further comprising means for tiltably adjusting said window to eliminate ghost reflections of said light beam from said window.

29. The apparatus of claim 20 wherein said target further comprises a pattern for indicating when said light beam and said reflective surface are normalized.

30. The apparatus of claim 20 wherein said mirror further comprises a plurality of apertures formed therethrough.

31. The apparatus of claim 20 wherein said target further comprises a photodetector.

32. The apparatus of claim 20 further comprising means for adjusting, in response to said light beam being reflected onto said target, a direction of propagation for said light beam to normalize said light beam to said reflective surface.

33. The apparatus of claim 32 wherein said adjusting means further comprises means for altering an orientation of said generating means to normalize said light beam to said reflective surface.

34. The apparatus of claim 33 wherein said altering means is a turntable for mounting said light source.

35. The apparatus of claim 34 wherein said turntable is automatically adjustable for rotation to locate a specific feature of said reflective surface.

36. In etch rate monitoring and etch-to-depth control systems, an apparatus for normalizing a light beam to a semiconductor wafer surface, comprising:

a light source for generating said light beam;

a mirror mounted to permit movement of said mirror to a first position and to a second position;

said mirror having an aperture through which, when said mirror is positioned in said first position, said light beam passes as the light beam propagates from said light source toward said semiconductor wafer surface to produce a reflected light beam, said reflected light beam propagates to said mirror, where, if the light beam is not orthogonal to the reflective surface, the reflected light beam reflects from the mirror onto a target; and said second position places said mirror outside of a propagation path of said light beam.

37. The apparatus of claim 36 further comprising a turntable for adjusting, in response to said light beam being reflected onto said target, a direction of propagation for said light beam to normalize said light beam to said semiconductor wafer surface.

38. A method of normalizing a light beam to a reflective surface comprising the steps of:

generating said light beam;

moving a mirror to a first position within a propagation path of said light beam from a second position outside of said propagation path;

passing said light beam through an aperture in said mirror;

producing a reflected light beam by reflecting said light beam from said reflective surface;

determining whether said reflected light beam is reflected by said mirror onto a target or is passed through said aperture in said mirror; and adjusting a propagation path of said light beam, if necessary, to achieve substantial passage of said reflected light beam through said aperture.

39. The method of claim 38 further comprising the steps of:

selectively positioning said mirror in said first position and said second position.

40. The method of claims 39 wherein said selectively positioning step further comprises the step of rotating the mirror about an axis located adjacent an edge of said mirror between said first mirror position, within said propagation path, and said second mirror position, outside said propagation path.

41. The method of claim 38 wherein said adjusting step further comprises the step of altering said orientation of said generating means to adjust the propagation path of said light beam.

* * * * *